United States Patent [19]

Poirier et al.

[11] Patent Number: 4,713,667

[45] Date of Patent: Dec. 15, 1987

[54] TARGET SUPPORT APPARATUS

[75] Inventors: J. Leon Poirier; Robert V. McGahan, both of Chelmsford, Mass.

[73] Assignee: The United States of America as represented by the Secretary of the Air Force, Washington, D.C.

[21] Appl. No.: 30,401

[22] Filed: Mar. 26, 1987

[51] Int. Cl.⁴ .............................................. G01S 13/88
[52] U.S. Cl. ....................................... 342/192; 342/1; 342/175
[58] Field of Search .................... 342/1, 165, 175, 190, 342/192

[56] References Cited

U.S. PATENT DOCUMENTS 2,602,924 7/1952 Schmitt et al. ...................... 343/100
3,274,597 9/1966 Archer et al. ....................... 343/100

OTHER PUBLICATIONS

"Introduction to Radar Cross-Section Measurements", P. Blacksmith, Jr. et al, Proc. IEEE, vol. 53, Aug. 1965, pp. 901-920.
"Target Support Parameters Associated with Radar Reflectivity Measurements", C. C. Freeny, Proc. IEEE, vol. 53, Aug. 1965, pp. 929-936.
"Antenna and Radar Cross Section Positioning Systems", Orbit Advanced Technologies 1987 catalog, pp. 5-7 and 54-57.
"Scattering Experiments at the Ipswich Electromagnetic Measurements Facility: Calibration with Perfectly Conducting Spheres", R. V. McGahan, RADC-TR-8-3-181, Aug. 1983.

Primary Examiner—T. H. Tubbesing
Attorney, Agent, or Firm—Richard J. Donahue; Donald J. Singer

[57] ABSTRACT

Target support structure for making bistatic radar cross section measurements. The support structure includes two parallel columns of circular cross section that may be coated with radar absorbing material. The rotational angle of the columns and the spacing therebetween are each adjustable to allow the bistatic reflections from each column to be phased to cancel each other at a selected bistatic angle and thereby minimize the background signal from the support structure.

8 Claims, 2 Drawing Figures

TARGET SUPPORT APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a target support apparatus. More particularly, it relates to an assembly for supporting and varying the attitude of a target (or target model), such as an aircraft or a missile, while performing radar cross section measurements thereon.

The ability to make accurate and therefore meaningful and useful measurements of the signals reflected from targets which are illuminated by radar signals is dependent upon the capability of reducing spurious reflections introduced into the measured return signal from objects in the immediate vicinity of the target, such as the target support device.

The accuracy of such measurements is known to be directly related to the radar cross section (sometimes abbreviated herein as RCS) of the target in comparison to the RCS of the target support device and other background objects.

The relationship of the contributions of the target signal and background signals in a measured radar return signal can be expressed by the following equation:

$$\sigma_m/\sigma_t \pm = 1 + (\sigma_\beta/\sigma_t) \pm 2(\sigma_\beta/\sigma_t)^{\frac{1}{2}}$$

where:
$\sigma_m$ = measured RCS
$\sigma_t$ = target RCS
$\sigma_\beta$ = background RCS and ± refers to the upper and lower bounds of the measurement error respectively.

For example, for equal background and target signal powers, (proportional to their RCS's) the value measured for $\sigma_m$ can be as much as four times greater than the actual target value and the minimum value observed can in fact be zero. The actual measurement error (between the bounds) is dependent upon the relative phases of the target and the background signals. The principal contributor to the background signal can be, and quite often is, the target support structure.

Additional background information concerning RCS measurements of targets can be found in various publications, including the following: "The Radar Handbook", Merrill Skolnik, McGraw Hill, 1970; "Scattering Experiments at the Ipswich Electromagnetics Facility: Calibration with Perfectly Conducting Spheres", Robert V. McGahan, RADC-TR-83-181, August 1983; and "Introduction to Radar Cross Section Measurements", P. Blacksmith, Jr. et al, Proc. IEEE, vol. 53, August 1965.

In monostatic type radar measurements of low radar cross section targets, where by definition the radar transmits and receives electromagnetic signals at substantially the same angular position with respect to the target, the target support structure of choice is usually a single columnar support having an ogival cross section. The ogival column is tilted forward at some angle from the vertical to reduce residual scattering from the support up to the target. The mechanism that rotates the target to various positions is mounted inside the ogive. A small diameter shaft extends from the drive motor through the top of the ogive and up to the target. This shape and geometry make the unwanted contribution of the background signal small enough to permit high accuracy RCS measurements. See for example, "A GTD Analysis of an Ogive Pedestal"; Kim-Yue Albert Lai and N. D. Burnside, T. R. 716748-8, Ohio State University; and "Antenna and Radar Cross Section Positioning Systems", Orbit Advanced Systems 1987 Catalogue, pp 55-57.

In bistatic radar measurements of targets however, the radar transmitter and receiver are located at different angular positions with respect to the target, and the ogival shape of the aforementioned support column produces a very large cross section at some bistatic angles that results in a very large background signal. This large background signal exerts such an overriding influence on the measured signal that the measurement accuracy is unacceptably poor. This is particularly true when measuring the responses of small bistatic RCS target or targets with deep nulls in their bistatic RCS patterns.

For many bistatic RCS measurements, the target support structure of choice is presently a single column of circular cross section, i.e., a long thin cylinder, since it provides more uniform scattering of the radar signal with various bistatic angles, than does the ogive. The target positioning mechanism is mounted inside the cylinder and connected to the target by a shaft, just as with the ogive support. In many applications, however, the size of the cylindrical support column is such that the bistatic scattering from the cylindrical column is too high, varies with bistatic angle, and may even exceed the monostatic value for the cylinder. This severely limits the minimum bistatic RCS of targets that can be measured accurately with such a structure even when the cylinder is coated with radar absorbing material to limit its reflectivity.

In order to decrease the bistatic reflection, the single cylindrical support column can be tipped at an angle from the vertical and rotated about the vertical axis to take advantage of the cylinder's highly lobed elevation plane scattering pattern. The energy scattered by the tipped support in the direction of the receiving antenna (bistatic angle) is then monitored as the support is rotated until a point is found where the signal is minimized. This point corresponds to a null in the scattering pattern of the support. This adjustment insures that the target to be measured, (which target is mounted on the shaft extending from the support cylinder only after this adjustment is made), is little affected by the energy scattered from the support structure directly toward the receiving antenna.

This cylindrical target support structure and technique however, has the associated disadvantage of relying on the aforementioned elevation plane nulls. Because the support column is much longer than the wavelength of the radar signal, the angular separations of the nulls are very small and their depths are very sensitive functions of the rotation and tip angles of the cylindrical support. Thus, this structure requires very rigid and stable components to prevent wind and temperature variations from moving the position of the null and degrading its depth during a measurement period. Also, the bandwidth of the nulls is narrow because of the long support cylinder, and moderate changes in the measurement frequency will require reestablishing the null by again rotating the tipped cylinder. The characteristics of the nulls are fixed by the structure and cannot be changed.

There are other subtle disadvantages to tipping the support column. One is that for certain angles, there can be a significant scattering component from the tipped column up to the target mounted above it. This spurious reflection corrupts the incident target signal and impairs the measured results even if the energy reflected from the support directly to the receiving antenna is zero. Another subtle disadvantage is that reflections down from the tipped cylinder can reflect from the ground and back up to the target also corrupting the incident field. Yet another is that tipping the cylinder decreases the height of the target above the ground, thereby increasing the possibility of target-ground interactions that could also degrade the measurements.

OBJECTS AND SUMMARY OF THE INVENTION

It is therefore the primary object of the present invention to provide an improved support structure for targets undergoing measurements of their response signatures to radar signals.

It is a more specific object of the present invention to provide a target support structure which has a low effective radar cross section for bistatic radar measurements.

It is yet another object of the present invention to provide a target support structure which scatters little energy vertically (up or down) and thus prevents corruption of the incident target signal in the target region from direct and indirect reflections.

In accordance with the present invention, a target support structure for performing bistatic radar measurements comprises two parallel and vertical columns whose spacing and azimuthal orientation can be changed. This allows the bistatic reflections from each column to be phased so as to cancel one another at any selected bistatic radar measurement angle. The vertical orientation of the target support structure minimizes the energy scattered from the columns up to the target and down to the ground where it could be re-reflected up to the target. The columns can be coated with radar absorbing material to further reduce their residual radar cross section.

BRIEF DESCRIPTION OF THE DRAWINGS

The foregoing and other objects, advantages and features of the present invention will become apparent from the following detailed description of the preferred embodiment of the invention, as illustrated in the accompanying drawings.

DETAILED DESCRIPTION OF THE INVENTION

Figure 1:
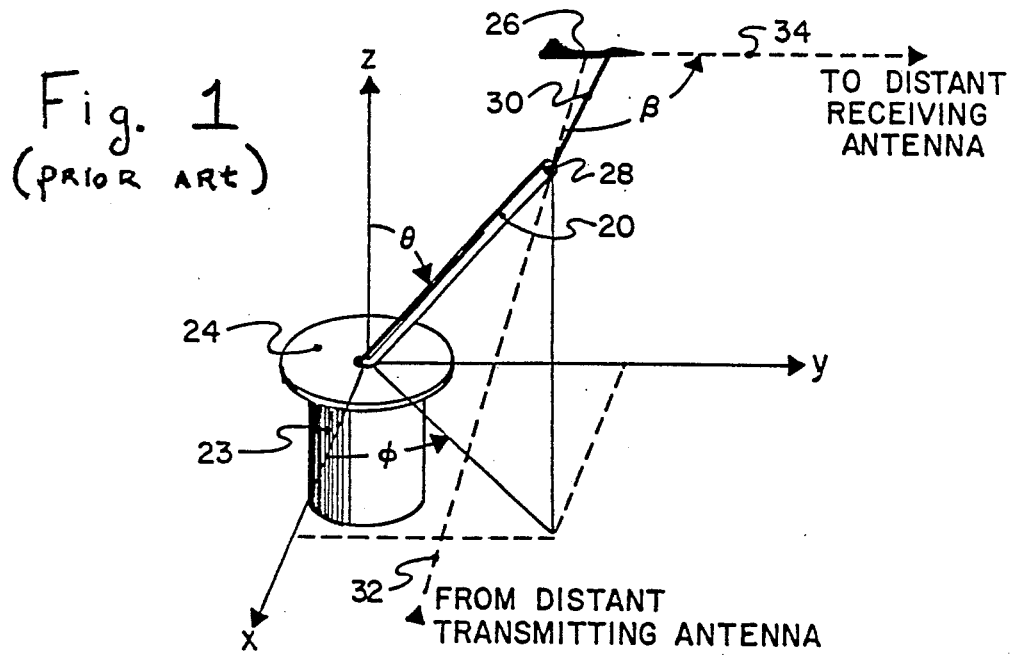
FIG. 1 is a pictorial illustration of a target support structure presently used for performing bistatic radar cross section measurements of small RCS targets.

Referring now to FIG. 1 of the drawings, there is shown the basic structure of the target support device discussed briefly above and presently being used for bistatic RCS measurements. It will be seen to consist of a single column 20 having a circular cross section and mounted to a base 24. Column 20 is tilted from the vertical by an angle $\theta$ and is rotatable on its base 24 by azimuth positioner 23 to a desired angle $\phi$. Such azimuth positioners are well known in this art and are described for example in the Orbit Advanced Systems Catalogue, supra. A target (or model) 26 to be measured is affixed to the top end 28 of column 20 by shaft 30. A drive means at or within top end 28 rotates target 26 through universally adjustable shaft 30 to provide the proper orientation (attitude) of target 26 relative to the measurement coordinates.

The transmitter (not shown) of a bistatic radar is seen to radiate a signal towards the target 26 in the direction of the dashed line 32. A receiver of energy reflected from target 26 and its support column 20 and shaft 30 is located in the direction designated by the dashed line 34. The angle so established between the radar transmitter direction 32 and receiver direction 34 is designated in the drawings as the bistatic angle $\beta$ and can range between 0 degrees (backscatter) and 180° (forward scatter). The angle of rotation of the tilted columnar support 20 about the vertical coordinate z with respect to the coordinate x is designated as the angle $\phi$ while the angle of tip of support 20 with respect to the coordinate z is designated as the angle $\theta$. The azimuth angle $\phi$ is generally not equal to the bistatic angle $\beta$ but preferably near the value $\beta/2$.

Figure 2:
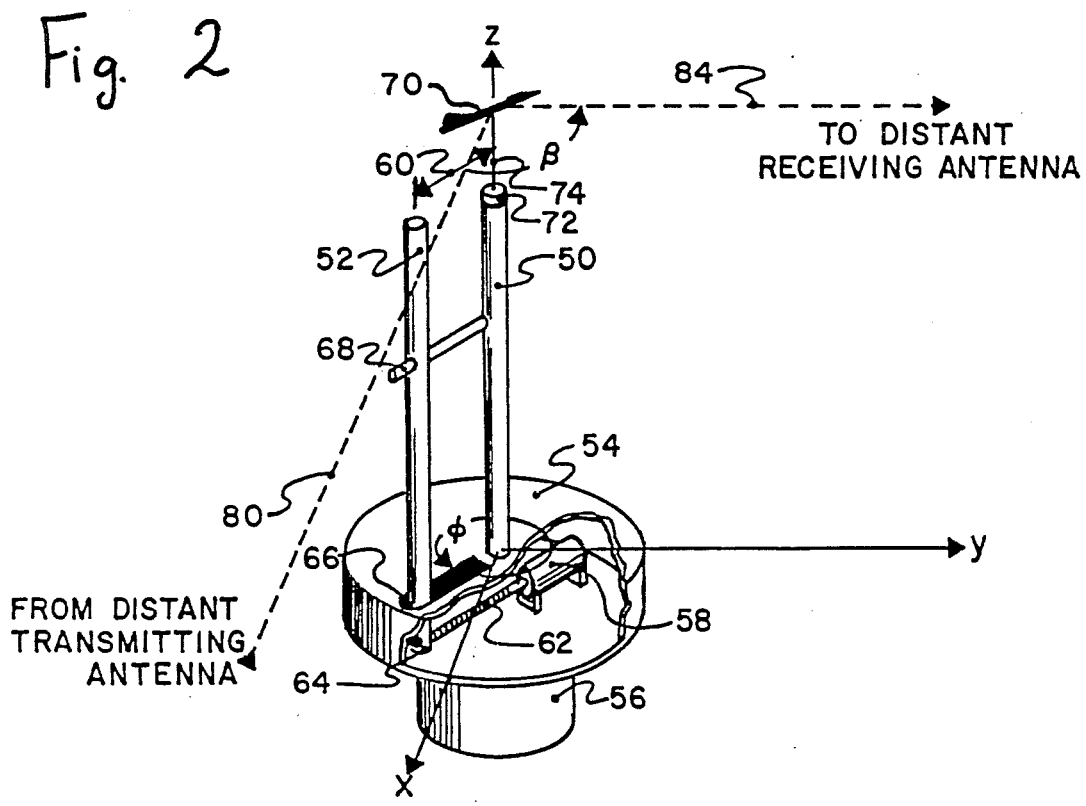
FIG. 2 is a pictorial illustration of the improved target support structure of the present invention.

Referring now to FIG. 2 of the drawings, there is shown the novel target support assembly which comprises a pair of parallel columns 50 and 52 which are affixed at one end to a base plate assembly 54. Columns 50 and 52 are preferably hollow metallic columns which are covered by radar absorbing material. In some applications, however, the columns may be constructed with nonconducting material such as fiber glass. The columns 50 and 52 preferably have the same outer diameter so as to exhibit the same signal reflection characteristics. The orthogonal coordinates, x, y, and z, and the angles $\phi$, $\theta$ and $\beta$ are the same as those designated in FIG. 1 of the drawings except that now $\theta = 0°$.

Columns 50 and 52 are maintained vertical, i.e., in the direction of coordinate z. The vertical plane defined by columns 50 and 52 may be rotated about vertical axis z by the application of power to azimuth positioner 56 that rotates base assembly 54. A second drive means 58 in base assembly 54 is used to vary the spacing 60 between columns 50 and 52 through drive screw 62 engaged to column extension 64 that passes through slot 66 in the top plate of assembly 54. Stabilizer 68 is firmly attached to column 50 but free to slide through column 52 and provides rigidity to column 52. A target 70 to be measured is placed atop column 50.

It will be noted that the size of the target support assembly is shown to be much larger than the target 70. This has been done in order to better illustrate the details of the support structure. However, in practice, the support structure is made only sufficiently large to support the weight and wind loading presented by target 70. A target positioner drive unit 72 is preferably mounted in the top end of column 50 and will rotate target 70 through a shaft 74. Shaft 74 is of short length and small diameter compared to target 70 and column 50. For maximum target positioning flexibility, shaft 74 may be set up with ball couplings at each end to permit rotation of the model about any axis chosen as in the case of the prior art test structure of FIG. 1. As before described, electromagnetic energy from a distant radar transmitter is directed toward target 70 along dashed line 80 and is received by a distant radar receiver in the direction indicated by dashed line 84. The bistatic angle $\beta$ is the angle between lines 80 and 84.

In operation, for each bistatic angle $\beta$ at which measurements are to be taken, the angular position $\phi$ of the columns 50 and 52 without target 70 is varied by azimuth positioner 56 until the position of minimum signal is found. If no definite high quality null is found, the spacing 60 between support columns 50 and 52 is increased by drive means 58. Then azimuth positioner 56 which adjust the angle $\phi$ is varied again until the signals reflected from the two columns 50 and 52 are out of phase and thus cancel each other, thereby minimizing the background signal at the radar receiver. A null can always be found quickly this way.

The larger the bistatic radar angle $\beta$, the further apart are the scattering nulls in the response pattern of the rotating columns and the larger the separation distance 60 must be. However, adjusting the spacing and rotational angle of the columns 50 and 52 provides a high quality null at any bistatic angle.

The important improvements provided by this invention include broader bandwidth nulls, wider angle nulls, deeper nulls, and greater control over the nulls because of the independent control of the column spacing and rotational angle. In addition, the structure minimizes the possibility of scattering from the columns to the target and minimizes the interaction between the target and the ground. Together, these improvements provide for a more robust support structure that is less susceptible to effects of wind, temperature, and alignment, and one that ultimately reduces the background signal to very low levels.

While the invention has been described with reference to a particular embodiment thereof, numerous adaptations and modifications of the invention will be apparent to those of skill in the art and hence it is intended by the appended claims to cover all such modifications and adaptations as fall within the spirit and scope of the invention.

What is claimed is:

1. Apparatus for supporting a target undergoing radar measurements comprising:
   a base assembly;
   azimuthal positioner means coupled to said base assembly for rotating said base assembly in an azimuthal plane;
   a first and a second column being parallel and attached perpendicular to said base assembly;
   column separation adjusting means for adjusting the spacing between said first column and said second column;
   target attitude positioning means affixed to the distal end of said first column; and
   means for affixing a target to said target attitude positioning means.

2. Apparatus as defined in claim 1 and further comprising:
   stabilizer means orthogonally bridging said first and said second column and permitting parallel movement therebetween.

3. Apparatus as defined in claim 2 wherein said means for affixing said target to said target attitude positioning means includes a shaft coupled between said target and said target attitude positioning means.

4. Apparatus as defined in claim 3 wherein said first column is attached to said base assembly at the azimuthal rotational axis of said base assembly.

5. Apparatus as defined in claim 4 wherein said first column and said second column each have a cylindrical cross section and are formed of metallic material.

6. Apparatus as defined in claim 5 wherein said first column and said second column are each covered by radar absorbing material.

7. Apparatus as defined in claim 6 wherein said first column and said second column have the same outer diameter.

8. Apparatus as defined in claim 4 wherein said first column and said second column are each formed of fiber glass material.

* * * * *

UNITED STATES PATENT AND TRADEMARK OFFICE
CERTIFICATE OF CORRECTION

PATENT NO. : 4,713,667
DATED : December 15, 1987
INVENTOR(S) : J. Leon Poirier et al It is certified that error appears in the above-identified patent and that said Letters Patent is hereby corrected as shown below:

In column 1, on line 31, the equation should read :

$$(\sigma_m/\sigma_t)_{\pm} = 1 + (\sigma_B/\sigma_t) \pm 2(\sigma_B/\sigma_t)^{1/2}$$

Signed and Sealed this

Twelfth Day of July, 1988

*Attest:*

*Attesting Officer*

DONALD J. QUIGG

Commissioner of Patents and Trademarks